July 18, 1939.  L. E. W. MONTROSE-OSTER  2,166,456
CARRIAGE FOR VEHICLES MOVED PRINCIPALLY IN ONE DIRECTION
Filed July 7, 1936  2 Sheets—Sheet 1
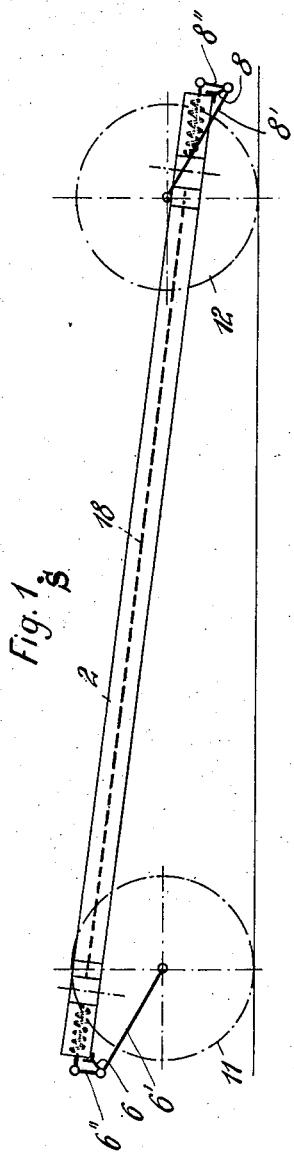
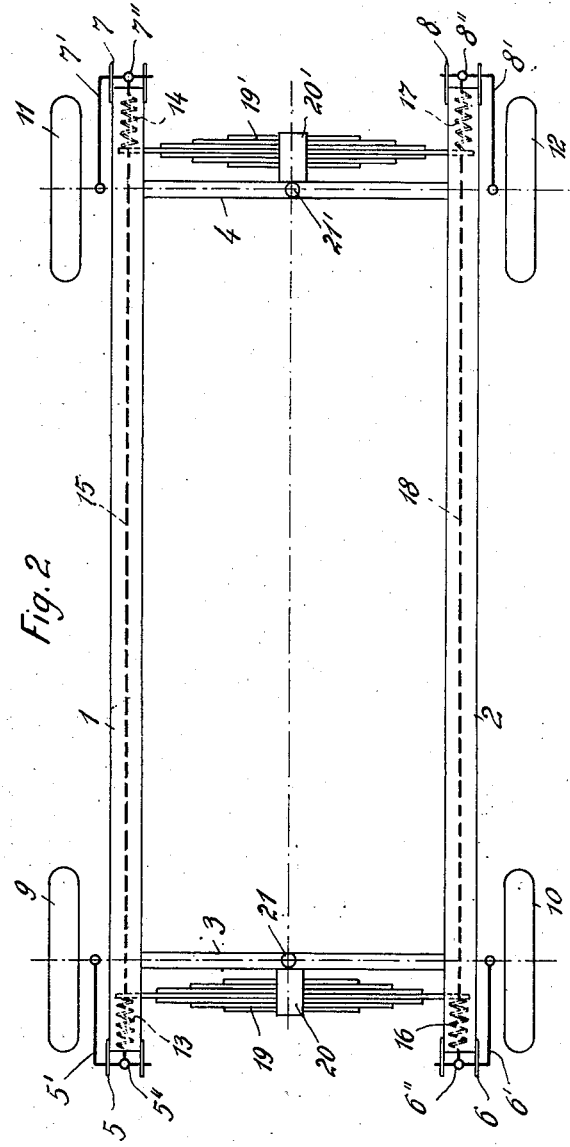
Inventor:

July 18, 1939.  L. E. W. MONTROSE-OSTER  2,166,456
CARRIAGE FOR VEHICLES MOVED PRINCIPALLY IN ONE DIRECTION
Filed July 7, 1936    2 Sheets-Sheet 2
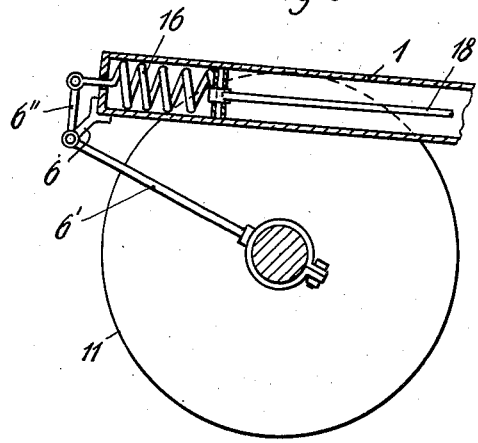
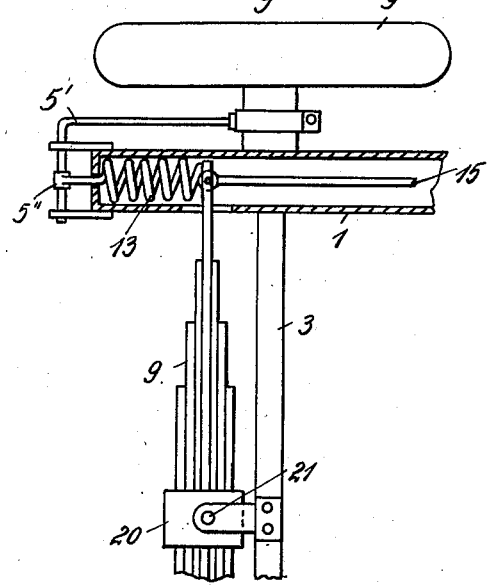
Inventor:
Louis Eugene Widolt Montrose-Oster
By
Williams, Bradbury, McCaleb & Hinkle
Attys.

Patented July 18, 1939

2,166,456

UNITED STATES PATENT OFFICE 2,166,456

CARRIAGE FOR VEHICLES MOVED PRINCIPALLY IN ONE DIRECTION

Louis Eugéne Widolt Montrose-Oster, Carlsbad, Czechoslovakia, assignor of one-half to Pollopas Patents, Ltd., London, England Application July 7, 1936, Serial No. 89,352
In Germany July 8, 1935

4 Claims. (Cl. 280—124)

The present invention relates to carriages and more particularly refers to carriages for vehicles moved principally in one direction.

Most vehicles, carriages, underframes and the like rest upon their support over four points or equivalent elements. Unevennesses of this support (ground, water) are equalized by connecting each point of rest, generally in form of a wheel, with the carriage by means of an elastic intermediate member (spring). Numerous spring arrangements of this kind are possible and carried out already. In most cases each individual wheel has for instance a spring which cooperates with it only. Constructions are, however, known also in which two wheels are connected to each other by a so-called compensating spring or a compound spring. Nearly all of the arrangements known hitherto have the disadvantage, that a twisting moment acts upon the underframe or frame as soon as the four points of support are not in the same plane.

Proposals have also been made according to which, by so-called joint frames, the frame permanently remains free of twists independent of the relative level of the individual points of support. While during dynamic lifting of one point of support and two points of support, lying in the same cross plane, respectively substantial advantages are obtained, for instance decreased gradient acceleration, these advantages are compensated by increased inclination in the curve and increased inclination towards the rear and towards the front during starting and braking. This partly is connected to the well known phenomenon, that it is practically impossible to find a spring arrangement adapted to satisfy all conditions. A weak spring arrangement perfectly yields to obstacles, but yields too much to loads and also in curves. A strong spring arrangement allows a suitable position in the curve and is little affected by load, but transmits the unevennesses of the road to the frame in an unpleasant manner.

The present invention solves the problem of combining a strong curve springing which also yields under load with a weak obstacle springing, to practically keep the frame free of twistings and to allow, under certain circumstances, that, even during the most severe braking, the rear parts of the frame cannot lift simultaneously with the downward movement of the front part.

In the accompanying drawings one construction according to the invention is diagrammatically shown by way of example.

Fig. 1 is a diagrammatic side elevational view of the frame of the vehicle in its initial position, or position of rest;

Fig. 2 is a top plan view of the frame in the same position;

Fig. 3 is a fragmentary elevational view of the left end of the frame and wheel, showing further details of construction regarding the springs in the position of Fig. 1; and Fig. 4 is a fragmentary top plan view of one wheel and the springs corresponding to the upper left-hand portion of Fig. 2.

From the drawings, persons skilled in the art may, without difficulty, ascertain the operation of the arrangement.

A rigid frame consisting of longitudinal members 1 and 2 and cross members 3 and 4 is provided at the ends of the longitudinal members with bearings 5—8. In each of these bearings a horizontal axle is journalled on which, in the direction of movement, a longer lever 5'—8' and, substantially at a right angle to the road, a shorter lever 5"—8" are mounted. These levers are immovably fixed to their corresponding connecting axis. In the case of the example, shown, the longer levers 5'—8', lying in the direction of movement, carry road wheels 9—12 mounted upon ordinary stub axle not shown in the drawings. The upper ends of the levers 5" and 7" are, for instance with the use of two helical springs 13 and 14, connected together by a rod 15. The upper ends of the levers 6" and 8" are, for instance with the use of two helical springs 16 and 17, connected to each other by a rod 18. The two rods 15 and 18 in turn are connected to each other by one or more leaf springs 19, 19' the straps 20 and 20' of which spherically rest at 21 and 21' upon the cross members 3 and 4 of the frame respectively. The mark S shows the place where the center of gravity is supposed to be.

If instead of leaf springs, rigid elements are used, the whole arrangement would be an example for a frame suspension free of twisting having a conjugate springing. Such an arrangement would, moreover, already have the following particular advantages.

1. Strong springing in curves.
2. Weak obstacle springing at one-sided obstacles.
3. Lowering of the frame parallel to itself, but no lifting of the rear end during braking.

To simplify the description of the operation, first of all it is assumed that instead of leaf springs 19, rigid balances are present.

It is at once to be seen from the drawings, that the arrangement simultaneously allows strong springing in curves and weak obstacle springing. The strain of the springs in a curve corresponds in effect to a strong one-sided load.

The load of the vehicle is transmitted to the springs 13, 14, 16, 17 and to the wheels, and a strain is exerted upon the springs, which corresponds to the momentum which is produced by the load acting upon the corresponding wheels, multiplied by the horizontal projection of the corresponding arm of the lever. Naturally, this projection is shorter than the lever itself. However, during the absorption of shocks which do not act perpendicularly to the road, but on an obtuse angle to the road, that is, nearly exactly perpendicular to the levers which carry the wheels, the momentum transmitted to the springs is larger, because in this case the forces must be multiplied with the actual length of the levers. The result is that the identical springs react harder under load and more smoothly under shocks.

The inclination of the vehicle on the curves corresponds to its action to a one-sided greater strain, so that the springs react in an analogous manner to springs under load; that is, they are hard. All four springs are articulate with each other, and therefore during the travel over obstacles the known advantages of this springing are present, and especially the vehicle frame does not suffer any torsional strains.

During braking, the wheels relative to the vehicle tend to remain still, and the momentum then acts on the front of the vehicle frame, which consists of the vital force of the frame multiplied by the lever arm, which is produced by the vertical projection of the arm of the lever in the front. Thus the vehicle tends to turn in a downward direction about the center point of the front wheel. On the rear wheel, the vehicle is likewise turned in a downward direction about the center point of the wheel, with a momentum which consists of the vital force of the vehicle multiplied by the vertical projection of the lever arm in the rear. Therefore, the vehicle frame has the tendency to lower in the front and in the rear.

The load stresses the spring with a lever arm of a length equal to the projection of the levers 6' and 8' (Fig. 1) which lever arm is considerably smaller than the real or true length of the lever arms 6' and 8'. Obstacles, however, stress the spring with a lever arm corresponding to the proper length of the levers 6' or 8'. If sudden braking occurs, all the wheels tend to lag with regard to the frame. Hereby the front end of the frame is turned downwardly about the centre of the front wheels and the rear end of the frame is also turned downwardly about the centre of the rear wheels, provided, that in elevation the extensions of the lever arms 7' and 8' (Fig. 1) pass at the right of the centre of gravity (point S of the drawing) of the whole arrangement. By suitably forming the brakes, care can be taken, that the braking moment does not cause lifting of the rear part of the frame.

The selective arrangement of one or more leaf springs instead of rigid elements allows a further improvement of the properties of the springs. If for instance the constant of the spring of the total of the leaf springs is equal to the half of that of one helical spring, the following results are obtained:

1. With regard to a normal springing, a five times smaller gradient acceleration occurs at a dynamic lift of the wheel,
2. Also at a dynamic lift of the axis,
3. In spite of the fact, that a multiple stronger springing in curves is obtained as with a normal arrangement, yet no inclination occurs during braking, while
4. The spring constant in kg./cm. lift of axis amounts to 0.6 and in kg./cm. lift of wheel to 0.55 only compared to 1 at ordinary springing.

The constant of spiral springing $= c$ kg./cm. The constant of the entire leaf spring $= 0.5$ c kg./cm. The spring smoothness of a wheel during lifting of the axle $=$ $$\frac{(c+0.5c) \times c}{(c+0.5c)+c} = \frac{1.5c^2}{2.5c} = 0.6 \ c.$$

The spring smoothness of a wheel during lifting of the wheel $=$ $$\frac{(c+0.25c) \times c}{(c+0.25c)+c} = \frac{1.25c^2}{2.25c} = 0.55 \ c.$$

Furthermore, it is characteristic of this invention that the additional compensation springing is supported on the frame. Only through such a support the joint springing, which in itself is unstable, becomes rigid and technically useful.

In the example illustrated, helical springs and leaf springs are shown for the sake of simplicity. Depending on the purpose for which the arrangement is constructed, the required springs are in each case selected corresponding to their characteristic. In particular, it will often be advisable to use rubber springs, for instance in case of carriages used for starting from and descending to earth or water.

The new arrangement is principally adapted for all vehicles moving in one direction only, i. e. in particular for carriages of aircrafts used for starting and descending from and to earth or water respectively, as well as for vehicles of all kinds having wheels, track-chains, floats, slippers and the like.

What I claim is:

1. A vehicle moved principally in one direction, comprising a frame, supporting members, bell crank levers, of which the axles are fixed to the frame or some equivalent part of the vehicle and of which one arm, being connected to said supporting members is inclined in an acute angle to the direction of movement of the vehicle, and of which the other arm being connected to a conjugate springing, arranged in one plane together with an additional compensating springing, this being arranged in balance form and journalled in its center to the frame or some equivalent part of the vehicle.

2. A vehicle as set forth in claim 1 in which said compensating springing consists of a plurality of leaf springs arranged in balanced form and journalled at its center in the frame.

3. A carriage as set forth in claim 1 in which said lever is journalled in the frame outside the wheel base.

4. A vehicle as set forth in claim 1 in which the arm of the bellcrank levers associated with the rear supporting member is inclined to the ground the vehicle is based on within such an acute angle that the center of gravity of the vehicle always lies between the two sides of this acute angle.

LOUIS EUGÉNE WIDOLT
MONTROSE-OSTER.